United States Patent
Arrivabene

[11] Patent Number: 5,301,571
[45] Date of Patent: Apr. 12, 1994

[54] AUTOMATIC SPEED GEAR FOR BICYCLES

[76] Inventor: Giuseppe Arrivabene, Via Solferino, 4, 25122, Brescia, Italy

[21] Appl. No.: 964,769

[22] Filed: Oct. 22, 1992

[30] Foreign Application Priority Data

Oct. 30, 1991 [IT] Italy .............................. MI91A-02884

[51] Int. Cl.[5] .............................................. G05G 1/14
[52] U.S. Cl. ................................... 74/594.3; 74/594.2; 280/260
[58] Field of Search .................. 74/594.1, 594.2, 594.3; 280/260, 261

[56] References Cited

U.S. PATENT DOCUMENTS 5,157,988 10/1992 Pinstock ......................... 74/594.2 X

FOREIGN PATENT DOCUMENTS 15419 7/1902 United Kingdom ............... 74/594.2

Primary Examiner—Leslie A. Braun
Assistant Examiner—Ryan W. Massey
Attorney, Agent, or Firm—Bucknam and Archer

[57] ABSTRACT

The present invention relates to an automatic speed gear for bicycles or the like, of the type comprising a pinion assembly, each pinion having a different number of teeth, the pinions being coupled to the hub of a wheel of the bicycle and being adapted to be selectively connected, through a chain, to a driving pinion operated by the bicycle pedals, the switching of the chain from a pinion to another pinion, of the pinion assembly on the wheel, being carried by displacing a chain guide element arranged near the pinion assembly, the speed gear being characterized in that the displacement of the chain guide element, and accordingly the switching of the transmission ratio, is performed automatically, depending on the effort exerted on the pedals and the amount of which can be adjusted depending on the user's requirements.

9 Claims, 3 Drawing Sheets

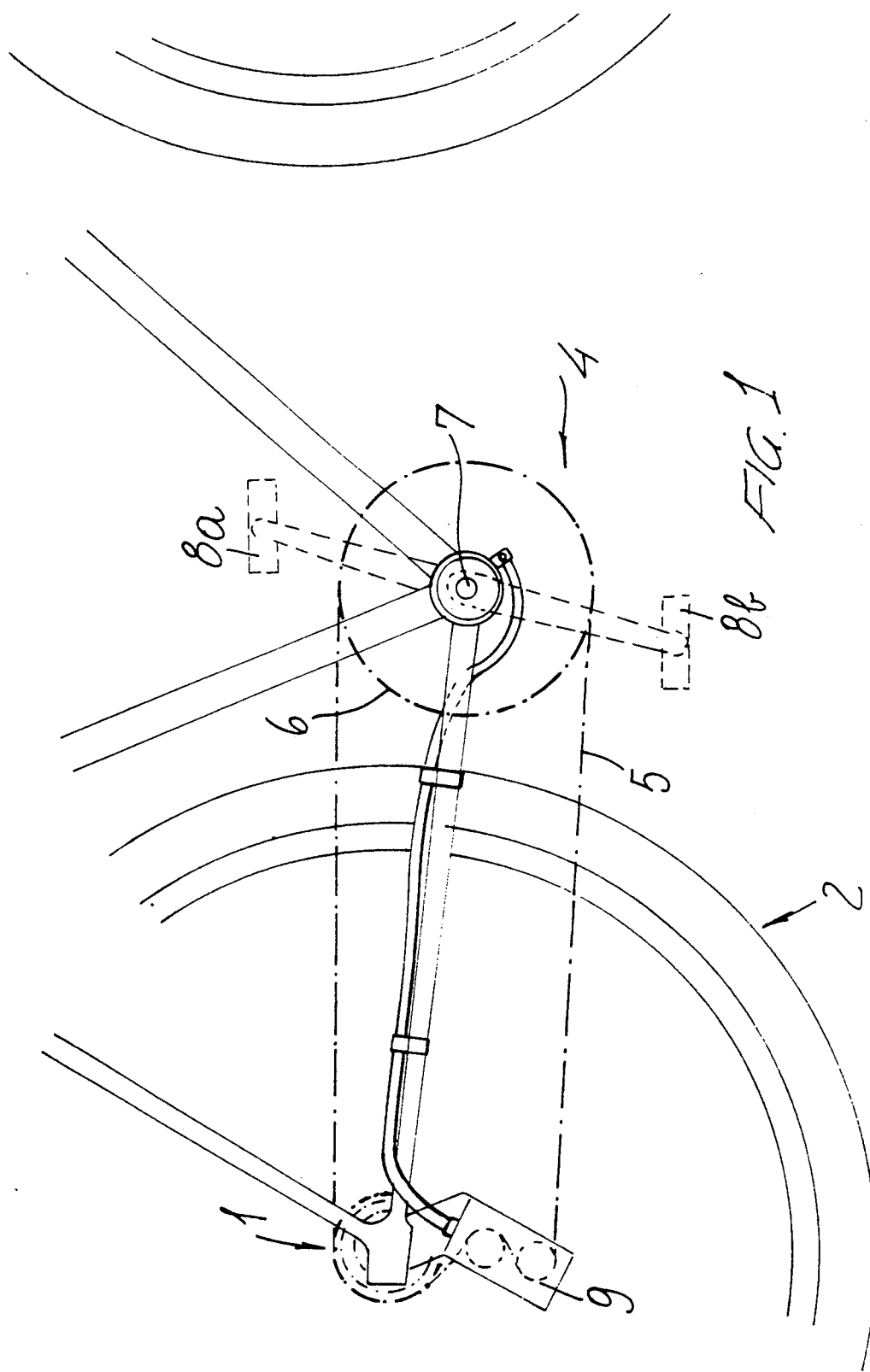

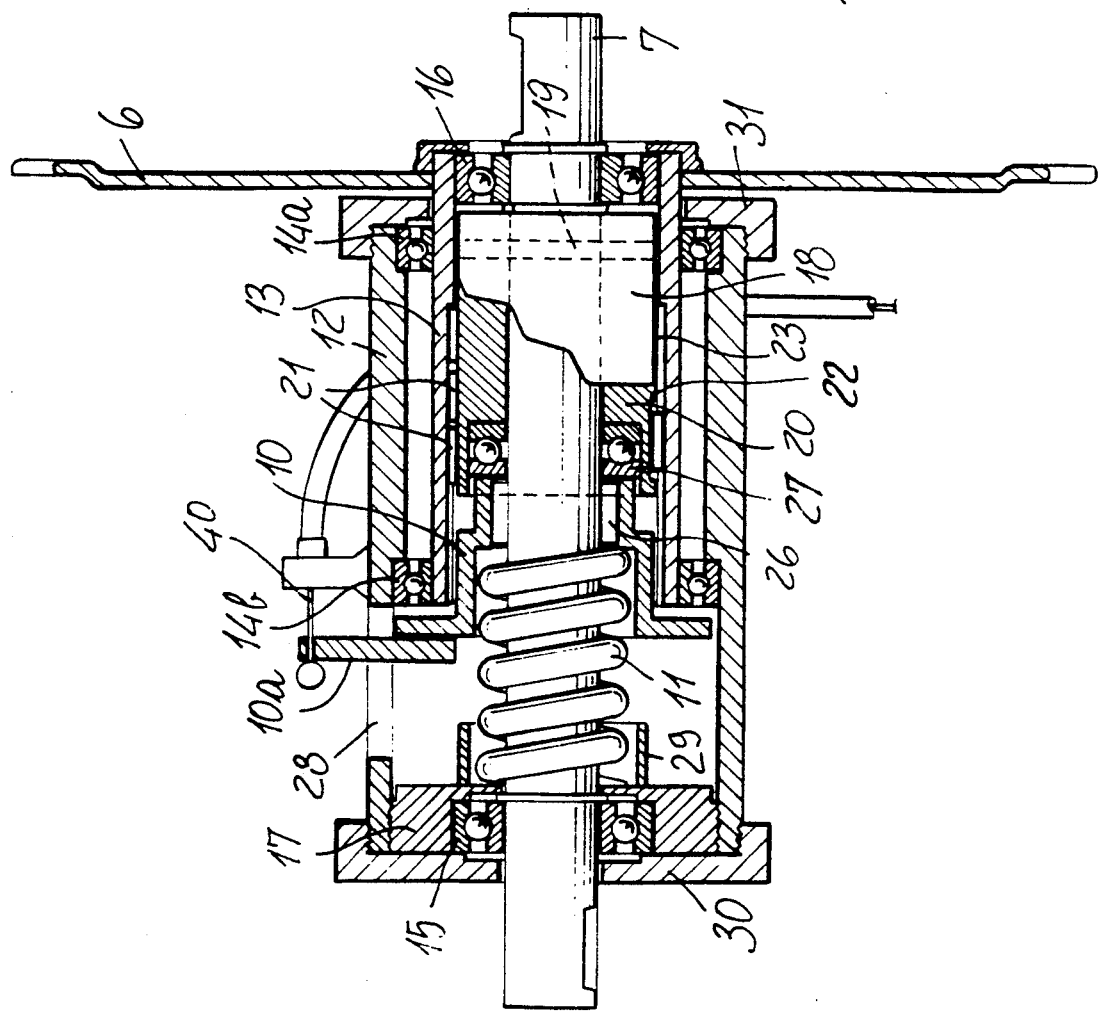

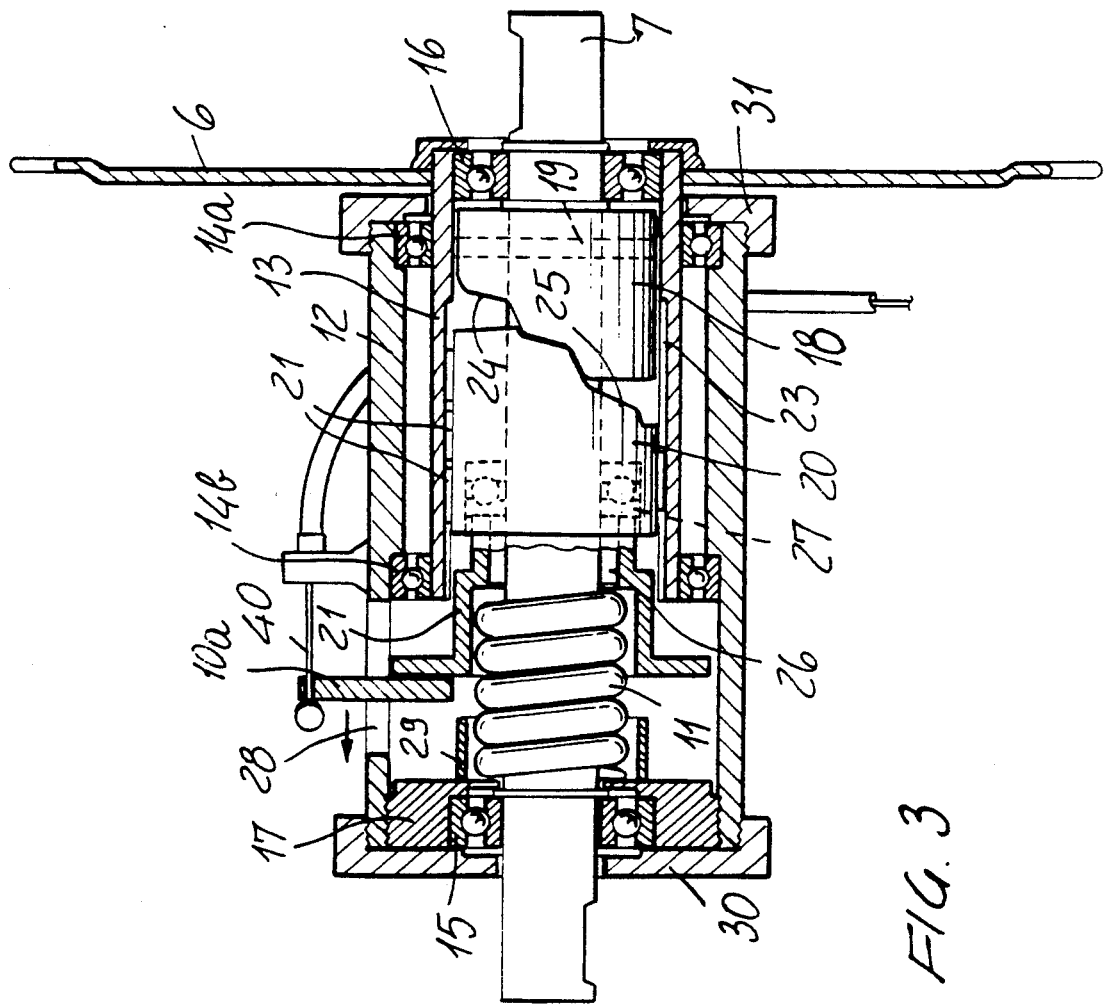

AUTOMATIC SPEED GEAR FOR BICYCLES

BACKGROUND OF THE INVENTION

The present invention relates to an automatic speed gear for bicycles and the like.

As is known, travel and sports bicycles are provided with a pinion assembly, including a plurality of pinions having a different number of teeth, which are applied to the hub of the bicycle rear wheel.

These pinions can be selectively coupled to a driving pinion, which is driven by the bicycle pedals, through the chain, and the switching over of the chain from one pinion of the assembly to another pinion thereof, is obtained by a chain-guide member, which is supported by the pin or axle of the rear wheel, near the pinion assembly.

The chain-guide member, which conventionally also comprises a chain sretcher, can be displaced with a parallel relationship with respect to the axle of the rear wheel, in order to cause the chain to be disengaged from a pinion and to be engaged with another pinion.

The displacement of the chain-guide member is transmitted by a lever, which can be manually operated, arranged on the bicycle handlebar and coupled to the chain guide member by means of a Bowden cable.

The speed gear, by changing the transmission ratio between the driving pinion and the rear wheel, allows a cyclist to reduce his/her effort in order to travel on slopes, or allows the cyclist to achieve quick accelerations and high speed in driving the bicycle.

In the most convenient speed gears for bicycles, the user, in order to operate the speed gear, is compelled to remove one of his/her hands from the handlebar, in order to operate the control lever.

Such an operation can cause dangerous skiddings of the cyclist which can have serious consequences, especially on a high traffic road.

Moreover, as a cyclist must travel on a slope, he must choose a priori the optimum transmission ratio allowing the cyclist to get over the slope without excessively reduce the travel speed.

This operation, which is easy for skilled cyclists, is comparatively difficult for unskilled cyclists who must try several gear ratios before finding the optimal ratio.

In this connection it should be pointed out that the actuation of the speed gear as a cyclist is exerting a comparatively great effort on the pedals may be dangerous, both with respect to the equilibrium of the cyclist and with respect to the preservation of a sound condition of the speed gear.

Thus, the aim of the present invention is to overcome the above mentioned drawbacks, by providing a speed gear for bicycles and the like which can be automatically controlled.

In particular, the speed gear according to the invention, which is adapted to automatically change the transmission or gear ratio, depending on the effort exerted by the cyclist on the bicycle pedal, allows the effort to be specifically fitted to the physical power of the user.

According to one aspect of the present invention, the above mentioned aim, as well as the above mentioned objects and other objects, which will become more apparent hereinafter, are achieved by an automatic speed gear for bicycles, or the like, comprising a driving pinion, rotatably rigid with a main driving shaft, which can be driven with a rotary motion about a rotary axis thereof by a pair of pedals, and an assembly of driven pinions, said driven pinions having different numbers of teeth, and being coupled to the hub of a wheel of the bicycle and being adapted to be selectively connected to the driving pinion by means of a chain, a chain guide member being moreover provided, which operates on the chain near the driven pinions, for causing the chain to be switched over from one of the pinions to another of said pinion, thereby changing the transmission or gear ratio, characterized in that it comprises a device for controlling the chain guide member, mounted on said shaft and including an element adapted to be axially displaced along the main shaft, as counter-biassed by resilient means, driving means being moreover provided affecting said movable element to displace it, against the biassing of said resilient means, as on said main shaft there is exceeded a preset torque effort, the movable element being coupled to the chain-guide member in order to cause the chain to be switched over from a driving pinion to another driven pinion, providing a less transmission ratio, as the preset torque effort is exceeded.

BRIEF DESCRIPTION OF THE DRAWINGS

Further characteristics and advantages of the present invention will become more apparent hereinafter from the following detailed disclosure of a preferred, though not exclusive, embodiment of an automatic speed gear for bicycles and the like, which is shown, by way of an indicative, but not limitative example, in the figures of the accompanying drawings, where:

FIG. 1 schematically shows the speed gear according to the invention, applied to a bicycle;

FIG. 2 is an enlarged cross-sectional view of the central drive of a bicycle including a speed gear according to the invention; and FIG. 3 is an analogous enlarged scale cross-sectional view illustrating the operation of the speed gear driving device.

DESCRIPTION OF THE PREFERRED EMBODIMENT

With reference to the number references of the figures of the accompanying drawings, the automatic speed gear according to the present invention comprises, in a per se known way, a pinion assembly 1, each pinion of which comprises a different number of teeth, the pinions being connected to the hub of the rear wheel 2 of a bicycle 4.

More specifically, the pinions 1 are coupled, through a coupling chain 5, to a driving pinion 6, which is coaxially arranged with respect to a main shaft 7, to which there are connected, in a known way, a pair of pedals 8a and 8b.

The switching of the chain 5 from a pinion to another pinion of the pinion assembly I is performed in a conventional way, by means of a chain guide element or member 9, including a chain tension element.

The chain guide element 9 is driven by a drive device, which is mounted on the main shaft 7 and comprises an element 10 which is movable along a direction parallel to the axis of the main shaft 7, as counterbiassed by resilient means 11.

The driving device comprises, moreover, driving means, driving the movable element 10 against the action of the resilient means 11, as the twist effort, transmitted by the main shaft 7 to the driving pinion 6, exceeds a maximum presettable value, so as to cause, through a connection provided between the movable element 10 and chain guide element 9, a reduction of the transmission ratio, as it will become more apparent hereinafter.

More specifically, the speed gear driving device is housed within a hollow cylindric body 12, for example of the type already mounted on existing bicycles.

The driving pinion 6 is coaxially affixed at the end portion of a hollow shaft 13 which is rotatably supported about its axis, inside the mentioned hollow cylindric body 12, through a pair of bearings 14a and 14b.

Inside and coaxially of the hollow shaft 13, there is arranged a main shaft 7, supported, near its end portions projecting from the hollow cylindric body 12 and hollow shaft 13, by means of two bearings 16 and 15 which are respectively arranged in the hollow shaft 13 and in a ring nut 17 screw engaged in the end portion of the hollow cylindric body opposite to the driving pinion 6.

The driving means for driving the movable element 10 comprise a twist joint, including a first half-joint 18 which is connected, for example by means of a connecting pin 19, to the main shaft inside the hollow shaft 13, and a second half-joint 20, which is rotatably mounted about the main shaft and which is adapted to axially slide along this main shaft.

The second half-joint 20 is made rotatably rigid, about the axis of the main shaft 7, with the hollow shaft 13 by means of small rollers 21, engaged in axial slots 22 and 23 formed on the outer surface of the second half-joint 20 and on the inner surface of the hollow shaft 13; accordingly, the second half-joint 20 can be axially displaced also with respect to the hollow shaft 13.

The two half-joints are formed as two cup cams, facing one another and being coupled according to a step profile, 24 and 25, including flat portions which are slanted with respect to the axis of the main shaft 7 so that a partial turning of the first half-joint 18, with respect to the second half-joint 20, causes an axial displacement of the second half-joint 20.

The movable element 20 is mounted, with a given clearance, about the main shaft 7, with the possible interposition of a sliding bush 26 which abuts, through a thrust bearing 27, against the end portion of the second half-joint 20, which is opposite with respect to the first half-joint 18.

The movable element 10 is provided with an arm 10a projecting from the hollow cylindric body 12 through a slot 28, extending in a direction parallel to the axis of the main shaft: thus, the movable element 10 is prevented from rotating about the axis of the main shaft 7.

The arm 10a, as shown, is connected to the chain guide element 9 by means of a Bowden cable 40.

The resilient means 11 affecting the movable element 10 comprise a spring arranged about the main shaft 7 and located between the ring-nut 17 and the movable element 10.

About the spring 11 there is arranged a cylindric element 29 abutting against the ring-nut 17 and operating as a spacer or limit element for the movable element 10.

The hollow cylindric body 12, in turn, is closed, at its axial end portions, by two cover elements 30 and 31 therefrom project the main shaft 7 and, on a side, the hollow shaft 13 with its portion to which there is connected the driving pinion 6.

It should be noted that the portion of the ring-nut 17 which is threaded within the hollow cylindric body 12 will determine or set the pre-loading of the spring 11.

The automatic speed gear according to the present invention operates as follows.

With the bicycle in its rest condition, that is in the absence of any twisting moment, applied to the main shaft 7 by operating the pedal, the spring 11, pressing on the second half-joint 20, holds the latter in its position of maximum abutting against the first half-joint 18.

As, during the travel, the effort exerted on the pedals is such as to subject the joint consisting of the two half joints 18 and 20 to a twist effort which, through the step profile, will transmit to the second half-joint 20 and effort larger than that exerted by the spring 11, then the second half-joint 20 will partially turn and will be axially displaced, with respect to the first half-joint, because of the step coupling, so as to press the spring 11.

This displacement is transmitted to the movable element 10 which, through the Bowden cable 40, will operate the chain guide element 9 so as to reduce the transmission ratio, by displacing the chain onto a rear pinion having a larger tooth number.

If the effort on the pedals is further increased, then the second half-joint 20 will be further displaced so as to further reduce the transmission ratio.

This reduction of the transmission ratio will reduce the effort on the pedals necessary to drive the bicycle: as this effort decreases so that the force of the spring 11 exceeds the axial force exerted by the first half-joint 18 on the second half-joint 20, the latter will be displaced in a direction opposite to the above disclosed direction, so as to cause the transmission ratio to increase.

From the above disclosure it should be apparent that the invention fully achieves the intended aim and objects.

In particular, the fact is to be pointed out that the automatic speed gear according to the present invention is such as to provide automatically the most suitable transmission ratio depending on the effort exerted on the bicycle pedals, without any specific skillness by the user.

Moreover, in the speed gear according to the invention it is possible to adjust the effort necessary to cause a variation of the transmission ratio, by suitably preloading the spring.

The invention as disclosed is susceptible to several modifications and variation, all of which will come within the scope of the invention.

Moreover, all of the details can be replaced by other technically equivalent elements.

I claim:

1. An automatic speed gear for bicycles comprising a driving pinion, rotatably rigid with a main driving shaft, which can be driven with a rotary motion about a rotary axis thereof by a pair of pedals, and an assembly of driven pinions, said driven pinions having different numbers of teeth, and being coupled to the hub of a wheel of the bicycle and being adapted to be selectively connected to the driving pinion by means of a chain, a chain guide member being moreover provided, which operates on the chain near the driven pinions, for causing the chain to be switched over from one of the pinions to another of said pinions, thereby changing the transmission or gear ratio, characterized in that it comprises a device for controlling the chain guide member, mounted on said shaft and including an element adapted to be axially displaced along the main shaft, as counterbiassed by resilient means, driving means being moreover provided affecting said movable element to displace it, against the biassing of said resilient means, as on said main shaft there is exceeded a preset torque effort, the movable element being coupled to the chain-guide member in order to cause the chain to be switched over from a driving pinion to another driven pinion, providing a less transmission ratio, as the preset torque effort is exceeded.

2. A speed gear according to claim 1, characterized in that said driving pinion is rotatable supported about said main shaft, and that said driving means comprise a twist joint, including a first half-joint, rigidly mounted about said main shaft, and a second half-joint, rotatably and slidably mounted about said main shaft and rotatably rigid, about the axis of said main shaft, with said driving pinion, said two half-joints being mutually connected by means of a contoured element including at least a portion slanted with respect to the axis of the main shaft, for causing the second half-joint to be axially displaced, with respect to the first half-joint, as the half-joints are mutually slidably rotated.

3. A speed gear according to claim 1, characterized in that said movable element is rotatably traversed by said main shaft and operates, through the interposition of said resilient means, against the axial end portion of the second half-joint, opposite with respect to the first half-joint.

4. A speed gear according to claim 1, characterized in that said resilient means comprise a spring arranged about said main shaft and located between said movable element and an axial shoulder, which can be adjusted along the axis of the main shaft, in order to change the reload on said spring.

5. A speed gear according to claim 2, characterized in that said half-joints are mutually connected by means of a step contoured element comprising flat portions which are slanted with respect to the axis of the main shaft.

6. A speed gear according to claim 1, characterized in that said driving means is arranged inside a hollow cylindric body, coaxial with respect to the main shaft and rotatably supporting, about a common axis, said driving pinion and main shaft.

7. A speed gear according to claim 6, characterized in that said movable element is rotatably rigid with said hollow cylindric body and being provided with an arm projecting from a slot formed through the wall of said hollow cylindric body and extending in a direction parallel to the axis of the main shaft.

8. A speed gear according to claim 7, characterized in that the arm, of the movable element, projecting from said hollow cylindric body, is connected to the chain guide element by means of a Bowden cable.

9. A speed gear according to claim 6 characterized in that said driving pinion is connected near an end portion of a hollow shaft projecting from an axial end portion of said hollow cylindric body, said hollow shaft being coaxial with respect to said main shaft and being rotatably supported about the axis thereof, by said hollow cylindric body, said hollow shaft rotatably supporting, about the axis thereof, said main shaft.

* * * * *